US012466090B2

(12) United States Patent
Caswell

(10) Patent No.: US 12,466,090 B2
(45) Date of Patent: Nov. 11, 2025

(54) RETRACTABLE KNIFE FOR RAPID MANUAL DEPLOYMENT WHILE FULLY GRASPED

(71) Applicant: GB II Corporation, Tualatin, OR (US)

(72) Inventor: Joseph Caswell, Newbury Park, CA (US)

(73) Assignee: GB II Corporation, Tualatin, OR (US)

( * ) Notice: Subject to any disclaimer, the term of this patent is extended or adjusted under 35 U.S.C. 154(b) by 0 days.

(21) Appl. No.: 18/057,091

(22) Filed: Nov. 18, 2022

(65) Prior Publication Data

US 2023/0085019 A1 Mar. 16, 2023

Related U.S. Application Data

(63) Continuation of application No. 16/934,564, filed on Jul. 21, 2020, now Pat. No. 11,524,416, which is a continuation of application No. 15/682,510, filed on Aug. 21, 2017, now Pat. No. 10,737,400.

(60) Provisional application No. 62/495,086, filed on Aug. 29, 2016.

(51) Int. Cl.

| | |
|---|---|
| ***B26B 1/04*** | (2006.01) |
| ***B26B 1/00*** | (2006.01) |
| ***B26B 1/10*** | (2006.01) |
| ***F41B 13/00*** | (2006.01) |
| ***F41B 13/08*** | (2006.01) |

(52) U.S. Cl.

CPC ................ *B26B 1/042* (2013.01); *B26B 1/00* (2013.01); *B26B 1/10* (2013.01); *F41B 13/00* (2013.01); *F41B 13/08* (2013.01)

(58) Field of Classification Search

CPC .. B26B 1/02; B26B 1/04; B26B 1/042; B26B 1/10; B26B 1/00

USPC .................................................... 30/159, 155

See application file for complete search history.

(56) References Cited

U.S. PATENT DOCUMENTS

| | | | | |
|---|---|---|---|---|
| 786,492 | A * | 4/1905 | Giranaldi | B67B 7/0429 D8/42 |
| 881,294 | A | 3/1908 | Billings | |
| 947,980 | A | 2/1910 | Romano | |
| 1,120,277 | A * | 12/1914 | Carlson | B26B 1/04 30/154 |
| 1,454,665 | A | 5/1923 | Bobek | |
| 1,505,368 | A * | 8/1924 | Golding et al. | B60B 1/12 301/37.104 |

(Continued)

FOREIGN PATENT DOCUMENTS

| | | | | |
|---|---|---|---|---|
| CN | 103182715 B * | 4/2016 | | B26B 1/05 |
| CN | 304492197 | 2/2018 | | |

(Continued)

OTHER PUBLICATIONS

West, four bar linkages, 2012.*

(Continued)

*Primary Examiner* — Adam J Eiseman
*Assistant Examiner* — Fernando A Ayala
(74) *Attorney, Agent, or Firm* — Klarquist Sparkman, LLP

(57) ABSTRACT

A self-defense pocket knife with handle of suitable proportion to be grasped in closed first and a conveyance system configured for the emergency manual conveyance of a blade from a position for storage to a position for use without requiring the user to appreciably alter or compromise grip upon the handle during the course of such conveyance.

20 Claims, 4 Drawing Sheets

(56) References Cited

U.S. PATENT DOCUMENTS

| | | | | |
|---|---|---|---|---|
| 1,505,386 | A * | 8/1924 | Golding | E04F 10/0651 160/68 |
| 1,665,955 | A | 4/1928 | Gatewood | |
| 1,706,918 | A * | 3/1929 | Erickson | B26B 1/02 30/315 |
| 1,743,022 | A | 1/1930 | Carman | |
| 1,918,708 | A * | 7/1933 | Miller | A47F 7/08 211/35 |
| 1,984,623 | A * | 12/1934 | Babin | E21B 19/161 81/472 |
| 2,262,645 | A * | 11/1941 | Newman | A01G 3/0251 30/238 |
| 2,561,682 | A | 7/1951 | Barnett | |
| 3,316,635 | A | 5/1967 | Merrow et al. | |
| 3,863,339 | A | 2/1975 | Reaney et al. | |
| 4,068,375 | A * | 1/1978 | Rathbun | B26B 5/001 30/162 |
| 4,173,068 | A | 11/1979 | Cargill | |
| D270,655 | S | 9/1983 | Collins | |
| 4,404,748 | A | 9/1983 | Wiethoff | |
| 4,451,982 | A | 6/1984 | Collins | |
| 4,502,221 | A | 3/1985 | Pittman | |
| 4,612,706 | A | 9/1986 | Yunes | |
| 4,719,700 | A | 1/1988 | Taylor, Jr. | |
| 4,722,140 | A | 2/1988 | Miceli | |
| 4,776,094 | A | 10/1988 | Glesser | |
| 4,805,303 | A | 2/1989 | Gibbs | |
| 4,811,486 | A | 3/1989 | Cunningham | |
| 4,837,932 | A | 6/1989 | Elsener | |
| 4,893,409 | A | 1/1990 | Poehlmann | |
| 4,974,323 | A | 12/1990 | Cassady | |
| 4,979,301 | A | 12/1990 | Walker | |
| 5,044,079 | A | 9/1991 | Gibbs | |
| 5,060,379 | A | 10/1991 | Neely | |
| 5,095,624 | A | 3/1992 | Ennis | |
| 5,111,581 | A | 5/1992 | Collins | |
| 5,293,690 | A | 3/1994 | Cassady | |
| 5,325,588 | A | 7/1994 | Rogers | |
| 5,331,741 | A | 7/1994 | Taylor, Jr. | |
| 5,425,175 | A | 6/1995 | Rogers | |
| 5,426,855 | A | 6/1995 | Keklak et al. | |
| 5,502,895 | A | 4/1996 | Lemaire | |
| 5,515,610 | A | 5/1996 | Levin et al. | |
| 5,537,750 | A | 7/1996 | Seber et al. | |
| 5,546,662 | A | 8/1996 | Seber et al. | |
| 5,596,808 | A | 1/1997 | Lake et al. | |
| 5,615,484 | A | 4/1997 | Pittman | |
| 5,685,079 | A | 11/1997 | Brothers et al. | |
| 5,689,885 | A | 11/1997 | Walston | |
| 5,692,304 | A | 12/1997 | Campbell | |
| 5,737,841 | A | 4/1998 | McHenry et al. | |
| 5,755,035 | A | 5/1998 | Weatherly | |
| 5,765,247 | A | 6/1998 | Seber | |
| 5,802,722 | A | 9/1998 | Maxey et al. | |
| 5,815,927 | A | 10/1998 | Collins | |
| 5,822,866 | A | 10/1998 | Pardue | |
| 5,826,340 | A | 10/1998 | Hull | |
| 5,878,500 | A | 3/1999 | Emerson | |
| 5,887,347 | A | 3/1999 | Gibbs | |
| 5,964,036 | A | 10/1999 | Centofante | |
| 6,079,106 | A | 6/2000 | Vallotton | |
| 6,154,965 | A | 12/2000 | Sakai | |
| 6,195,898 | B1 | 3/2001 | Lemisch | |
| 6,338,431 | B1 | 1/2002 | Onion | |
| 6,378,214 | B1 | 4/2002 | Onion | |
| 6,427,335 | B1 | 8/2002 | Ralph | |
| 6,438,848 | B1 | 8/2002 | McHenry et al. | |
| 6,477,777 | B1 | 11/2002 | Oliveri | |
| 6,490,797 | B1 | 12/2002 | Lake et al. | |
| 6,594,906 | B1 | 7/2003 | Sakai et al. | |
| 6,722,969 | B2 | 4/2004 | Hendrickson | |
| 6,725,545 | B2 | 4/2004 | Frank | |
| D495,772 | S | 9/2004 | Hibben | |
| 6,898,858 | B1 | 5/2005 | Spell | |
| D510,009 | S | 9/2005 | Lee | |
| 6,941,661 | B2 | 9/2005 | Frazer | |
| 7,036,229 | B1 | 5/2006 | Demko | |
| D553,467 | S | 10/2007 | Ryan | |
| D566,222 | S | 4/2008 | Hawk et al. | |
| D569,212 | S | 5/2008 | Hawk et al. | |
| 7,533,465 | B1 | 5/2009 | Frazer | |
| 7,676,930 | B1 | 3/2010 | Demko | |
| 7,681,316 | B2 | 3/2010 | Hawk et al. | |
| 7,905,022 | B2 | 3/2011 | Hawk et al. | |
| 7,940,510 | B2 | 5/2011 | Krudo | |
| 8,296,958 | B1 | 10/2012 | Frazer | |
| 8,353,109 | B2 | 1/2013 | Rohrbach | |
| 8,402,662 | B1 | 3/2013 | Douzanis | |
| 8,732,957 | B2 | 5/2014 | Rohrbach | |
| D713,923 | S | 9/2014 | Salvitti et al. | |
| 8,973,273 | B2 | 3/2015 | Brown et al. | |
| 9,174,347 | B2 | 11/2015 | Hongquan et al. | |
| D746,119 | S | 12/2015 | Pelton | |
| D746,120 | S | 12/2015 | Pelton | |
| 9,289,904 | B2 * | 3/2016 | Hawk | B26B 1/04 |
| D756,193 | S | 5/2016 | Horvath | |
| 9,751,221 | B1 * | 9/2017 | Aylsworth | B26B 1/04 |
| 9,808,940 | B1 | 11/2017 | Sakai | |
| 9,908,246 | B2 | 3/2018 | Frauenglass | |
| 10,189,169 | B2 | 1/2019 | Varner | |
| D865,480 | S | 11/2019 | Caswell | |
| 10,464,222 | B2 | 11/2019 | Frauenglass | |
| 10,737,400 | B2 | 8/2020 | Caswell | |
| D905,529 | S | 12/2020 | Caswell | |
| D925,325 | S | 7/2021 | Caswell | |
| 11,285,626 | B2 | 3/2022 | Caswell | |
| 2002/0029481 | A1 | 3/2002 | Eickhorn | |
| 2002/0059730 | A1 | 5/2002 | Flavigny | |
| 2003/0182966 | A1 | 10/2003 | Fotheringham et al. | |
| 2003/0213134 | A1 * | 11/2003 | Sakai | B26B 1/048 30/161 |
| 2005/0150115 | A1 | 7/2005 | Hanna | |
| 2006/0042098 | A1 | 3/2006 | Morales | |
| 2007/0124940 | A1 * | 6/2007 | Hawk | B26B 1/04 30/161 |
| 2009/0119929 | A1 * | 5/2009 | Monnig | A01G 3/0255 30/249 |
| 2009/0302591 | A1 * | 12/2009 | Auer | B62D 21/152 280/784 |
| 2011/0035847 | A1 | 2/2011 | Kishore et al. | |
| 2011/0140389 | A1 * | 6/2011 | Ellement | E06C 5/28 280/166 |
| 2013/0212886 | A1 * | 8/2013 | Hawk | B26B 1/02 30/155 |
| 2013/0247382 | A1 * | 9/2013 | Hongquan | B26B 5/001 30/156 |
| 2013/0327191 | A1 * | 12/2013 | Wason | G05G 11/00 81/489 |
| 2014/0001425 | A1 * | 1/2014 | Falcon | A47B 51/00 254/133 R |
| 2014/0249546 | A1 * | 9/2014 | Shvartsberg | B25J 9/0084 606/130 |
| 2016/0067801 | A1 * | 3/2016 | Cheng | B27B 5/188 83/471.3 |
| 2016/0368154 | A1 | 12/2016 | Varner | |
| 2017/0165849 | A1 | 6/2017 | DeBaker | |
| 2017/0210018 | A1 * | 7/2017 | Frauenglass | B26B 1/00 |
| 2018/0154531 | A1 | 6/2018 | Caswell | |
| 2018/0169876 | A1 | 6/2018 | Frauenglass | |
| 2019/0202072 | A1 | 7/2019 | Gariboldi | |
| 2020/0047357 | A1 | 2/2020 | Caswell | |
| 2020/0346356 | A1 | 11/2020 | Caswell | |

FOREIGN PATENT DOCUMENTS

| | | |
|---|---|---|
| CN | 207747078 | 8/2018 |
| CN | 304815344 | 9/2018 |
| CN | 305200534 | 6/2019 |
| CN | 305220330 | 6/2019 |
| DE | 102006047835 | 1/2008 |
| DE | 202015005079 | 10/2015 |
| DE | 102014012803 | 3/2016 |

(56) References Cited

FOREIGN PATENT DOCUMENTS

| | | | | | |
|---|---|---|---|---|---|
| DE | 202017003187 | * | 8/2017 | ............... | B26B 1/02 |
| EP | 2641705 A1 | * | 3/2013 | ............... | B26B 5/00 |
| WO | WO2018047077 | * | 3/2018 | ............... | B62B 1/02 |

OTHER PUBLICATIONS

"Caswell Knives," Instagram post https://www.instagram.com/pBH6AIdDgnD1/, page, Jul. 15, 2016 (retrieved Sep. 2, 2021).
"Caswell Knives," Instagram post https://www.instagram.com/p/BIx_C6rgj1F/, 1 page, Aug. 6, 2016 (retrieved Sep. 2, 2021).
"Caswell Knives," Instagram post http://www.instagram.com/caswellknives/, 3 pages, Aug. 29, 2016 (retrieved Sep. 2, 2021).
Design U.S. Appl. No. 29/700,146, filed Jul. 31, 2019 (12 pages).
Ex Parte Quayle Office Action dated Apr. 2, 2019, issued for U.S. Appl. No. 29/674,309 (10 pages).
Non-Final Office Action dated May 1, 2019, issued for U.S. Appl. No. 15/682,510 (18 pages).
Non-Final Office Action dated Nov. 27, 2020, issued for Design U.S. Appl. No. 29/714,036 (13 pages).
Non-Final Office Action dated Jun. 11, 2021, issued for U.S. Appl. No. 16/527,820 (23 pages).
Office action dated Jun. 19, 2020, issued by the Taiwan Intellectual Property Office in Taiwan Application No. 108308125, with English translation (5 pages).
Office Action dated Apr. 20, 2022, issued for Chinese Patent Application No. 201910715870.X, with English translation (25 pages).
Final Office action dated Mar. 15, 2022, issued for U.S. Appl. No. 16/934,564 (21 pages).
Non-Final Office Action dated Aug. 19, 2021, issued for U.S. Appl. No. 16/934,564 (9 pages).
Non-Final Office action dated Mar. 9, 2023, issued for U.S. Appl. No. 17/677,690 (38 pages).
Non-Final Office Action dated Jun. 24, 2022, issued for U.S. Appl. No. 16/934,564 (19 pages).
Notice of Allowance, dated Oct. 7, 2022, issued for U.S. Appl. No. 16/934,564 (11 pages).
Office action, dated Aug. 11, 2022, issued for TW Application No. 108127028, 29 pages—with Eng. Translation.
Office action, dated Feb. 16, 2023, issued for TW Application No. 108127028, 4 pages—with Eng. Translation.
Final Office Action dated Aug. 10, 2023, issued for U.S. Appl. No. 17/677,690, 29 pp.
Non-Final Office Action dated Nov. 21, 2023, issued for U.S. Appl. No. 17/677,690, 27 pp.
Final Office Action dated May 14, 2024, issued for U.S. Appl. No. 17/677,690, 34 pp.
Notice of Allowance dated Sep. 3, 2024, issued for U.S. Appl. No. 17/677,690, 13 pp.

* cited by examiner

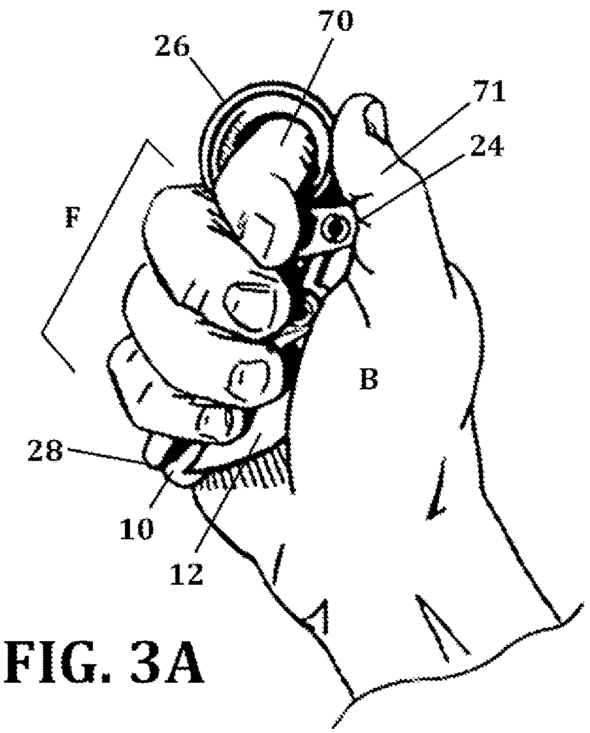
FIG. 3A
FIG. 3B
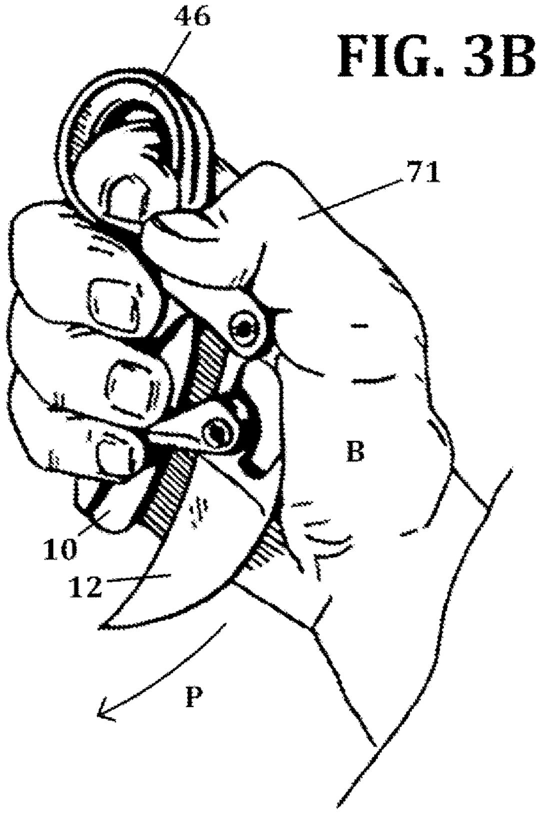
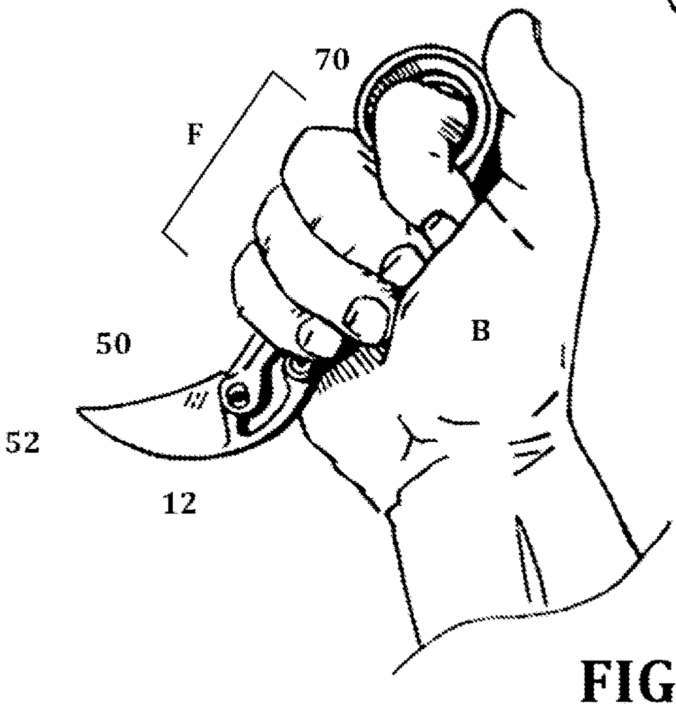
FIG. 3C

RETRACTABLE KNIFE FOR RAPID MANUAL DEPLOYMENT WHILE FULLY GRASPED

CROSS-REFERENCE TO RELATED APPLICATIONS

This application is a continuation of U.S. patent application Ser. No. 16/934,564, filed on Jul. 21, 2020, which is a continuation of U.S. patent application Ser. No. 15/682,510, filed on Aug. 21, 2017, now U.S. Pat. No. 10,737,400, which claims the benefit of U.S. Provisional Patent Application No. 62/495,086, filed on Aug. 29, 2016, each of which is incorporated herein by reference.

STATEMENT REGARDING GOVERNMENT SPONSORED RESEARCH AND DEVELOPMENT

Not Applicable.

FIELD OF INVENTION

This invention relates to pocket knives. More specifically, it relates to a style of versatile emergency defensive pocket knife that presents unique challenges with regard to emergency deployment of the blade from a position for storage to a position for use.

BACKGROUND

For folding knives, a convenient means for deploying a blade from a position for storage to a position for use is highly desirable. Typically, folding knives are configured for the conveyance of a blade between these positions by means of rotational movement facilitated by a pivot located generally at one of two prominent ends of a handle that is specially configured to accept the blade when pivoted into its prescribed position for storage. This requires the user to manipulate the handle in such a way as to accommodate the blade's movement, which is generally perpendicular to its rotational axis. As a result, a user cannot maintain a full grasp, with fingers encircling the handle of the tool, while the blade is rotated from its position for storage to its position for use.

Examples of folding knives referenced above may be found in U.S. Pat. Nos. 1,454,665; 1,743,022; 4,173,068; 4,404,748; 4,451,982; 4,502,221; 4,612,706; 4,719,700; 4,776,094; 4,805,303; 4,811,486; 4,837,932; 4,893,409; 4,974,323; 4,979,301; 5,044,079; 5,060,379; 5,095,624; 5,111,581; 5,293,690; 5,325,588; 5,331,741; 5,425,175; 5,426,855; 5,502,895; 5,515,610; 5,537,750; 5,546,662; 5,596,808; 5,615,484; 5,685,079; 5,689,885; 5,692,304; 5,737,841; 5,755,035; 5,802,722; 5,815,927; 5,822,866; 5,826,340; 5,887,347; 5,964,036; 6,079,106; 6,154,965; 6,338,431; 6,378,214; 6,427,335; 6,438,848; 6,490,797; 6,594,906, the disclosures of which are herein incorporated by reference.

Importantly, the present invention concerns a category of emergency defensive folding knife specifically configured to be grasped by the user, with fingers securely encircling the handle and forming a fist, regardless of whether the blade is in its position for storage or its position for use. That is because this category of defensive folding knife is generally expected to provide utility as an impact or compliance tool while the blade is secure in its position for storage, defining an important auxiliary mode of operation. However, the need to release the handle from the aforementioned grip to accomplish movement of the blade from its position for storage to its position for use, should the need arise, constitutes a well-recognized limitation.

This category of emergency defensive folding knife is known to the art and is generally characterized by a handle with pronounced ring-shaped projection from one of two prominent ends of an elongated handle. While there are numerous variations within this category, the specific variation known generally as the "karambit" is most relevant to the preferred embodiment of the present invention disclosed herein. As a result, the following will detail considerations relevant to the karambit specifically, though this should not be construed to unduly limit the scope of the present invention.

The karambit and related variants, hereinafter referred to as "karambit", have become increasingly popular among martial arts practitioners as well as military and law enforcement professionals. That is because, in addition to excellent utility as a general-purpose cutting tool, it is also well regarded as an emergency defensive weapon.

Folding karambit design is, here-to-for, conspicuously derivative of traditional folding knife design already well known to the art and referenced above. Specifically, a folding karambit of prior art generally includes a blade configured to rotate to and from a position for storage by means of a pivot that is generally located near one of two prominent ends of a handle. The difference being that a folding karambit of prior art simply includes certain defining characteristics such as a generally curved profile and a pronounced ring located at the end of a handle generally opposite the aforementioned pivot end. The ring is of suitable size to accommodate insertion of an index finger, and may not always form a complete circle or conform to a strictly circular shape. A non-folding karambit of prior art is disclosed in DE201520005079 wherein the typical karambit handle is described.

As previously summarized, the folding karambit may be used with blade extended and exposed for use, or it can be used with the blade secure in its position for storage. Regardless of whether the blade is in its position for storage or in its position for use, the karambit handle is properly grasped in a "reverse" or "ice pick" grip, with index finger positioned securely through the handle's ring and remaining fingers closed around the handle to complete a fist. Held thus, the ring projects from the radial portion of the first and encompasses the index finger, while the blade projects from the opposite, or ulnar, portion of the fist, should it be deployed.

Held in this fashion and with blade alternatively secure in its position for storage, there remains a portion of the handle protruding from the ulnar portion of the user's closed fist. Along with the exposed portion of the ring encircling the index finger, the protruding portion of the handle from the ulnar portion of the first is regarded as convenient means for a wide variety of compliance techniques practiced in various marital arts and used by police and military personnel worldwide. The karambit is, therefore, desirable as both an impact/compliance tool and as a bladed tool, suitable for utility and defensive. A folding karambit of prior art is taught in U.S. Pat. No. 7,940,510, Krudo, wherein the inherent benefits as a compliance tool, with blade secured in its position for storage, are clearly described.

Never-the-less, because they are generally derived from common folding knife design, with blade pivoting about a single rotational axis located generally at one prominent end of a handle, prior art folding karambits inherit an inability to instantly convert from non-bladed impact and compliance tool to bladed tool in a moment of need. That is because once brought into action and held properly in the first as an impact or compliance tool, with blade secure in its position for storage, deploying the blade to its position for use necessitates that the encircling grip forming a first about the handle be relinquished so as to provide a path for the blade to travel about its rotational axis. Considering that the need to switch from impact and compliance tool to bladed tool is likely to arise in the context of combative crisis, this particular inefficiency is not a trivial consideration.

Without a solution in sight, those skilled in the art have, instead, developed means to provide rapid initial deployment of a blade as it is drawn from a pocket. A presently ubiquitous example of such means is generally described as a hook-shaped projection from a portion of the blade opposite a cutting edge and generally proximal to the blade pivot. This hook is configured to catch upon the edge of a user's pocket as the knife is drawn. Being positioned generally radially outwardly from the pivot, the hook effectively translates the linear motion of the handle, being pulled from a pocket, to rotational movement of the blade, impelling it from its position for storage to its position for use. This concept of blade deployment is central to the teachings of U.S. Pat. No. 5,878,500, Emerson, U.S. Pat. No. 7,036,229, Demko, and U.S. Pat. No. 8,402,662, Douzanis, among others. Unfortunately, these provide benefit only when the blade is to be deployed immediately from the pocket. As a result, a blade deployed in this fashion is precluded from being initially brought to bear as an impact or compliance tool.

Still unaddressed is the need of the user that initially involves the karambit as an impact or compliance tool, with the blade in its position for storage, to suddenly deploy the blade to its position for use easily and without the need to relinquish an established, encircling grip upon the handle, presumably in the context of crisis.

SUMMARY

Consistent with the present invention, the aforementioned problem is solved by providing an emergency defensive knife that includes the desirable characteristics previously defined and associated with the karambit, and also includes a novel blade conveyance system configured to enable convenient, manual conveyance of a blade from its position for storage to its position for use. This propulsion is accomplished while the user maintains a firm grip upon the tool, with fingers encircling the handle substantially defining a fist.

DESCRIPTION OF DRAWINGS

The foregoing, as well as other objects of the present invention, will be made further apparent from the following detailed description of the present invention when taken together with the accompanying specification and drawings in which:

FIG. 3A shows the present invention as it might appear in the hand and in such condition that the blade is in its position for storage.

FIG. 3B shows the present invention as it might appear in the hand and in such condition that the blade is between its position for storage and its position for use.

FIG. 3C shows the present invention as it might appear in the hand and in such condition that the blade is in its position for use.

DETAILED DESCRIPTION

A review of relevant prior art is necessary to properly appreciate the problems addressed by the present invention. To this end, FIGS. 4A and 4B depict a typical prior art folding karambit 5P held in a first B, with index finger 70 (FIG. 4B) properly inserted through prior art ring portion 47P, and with fingers F securely encircling prior art handle 33P.

Figure 4A:
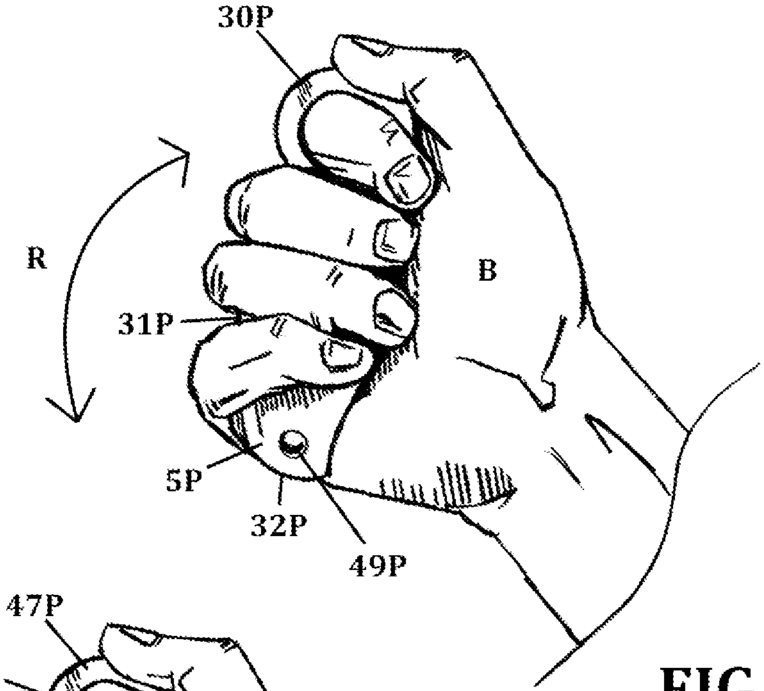
FIG. 4A (Prior Art)
FIG. 4A shows a knife of prior art as it might appear in the hand and in such condition that the blade is in its position for storage.
Figure 4B:
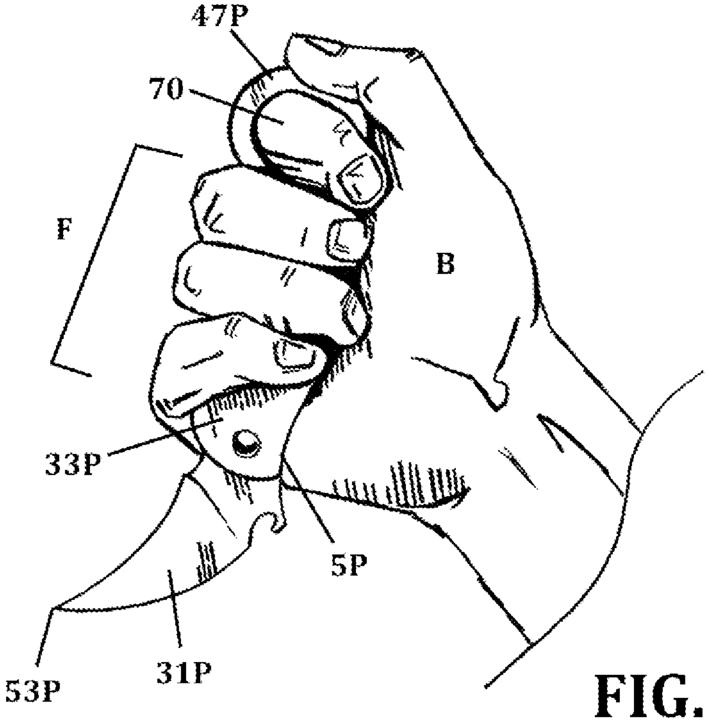
FIG. 4B (Prior Art)
FIG. 4B shows a knife of prior art as it might appear in the hand and in such condition that the blade is in its position for use.

FIG. 4A depicts prior art folding karambit 5P with prior art blade 31P in its position for storage and substantially encircled by fingers F comprising a first B. Prior art blade 31P is configured to pivot about a rotational axis defined by prior art blade pivot 49P, resulting in rotational path of prior art blade R.

Prior art folding karambit 5P, with prior art blade 31P in position for storage as shown in FIG. 4A, is desirable for use as an impact and compliance implement because of prior art impact/pressure surface A 30P, and prior art impact/pressure surface B 32P. Should the user wish to bring prior art blade 31P to bear (FIG. 4B), it can be readily appreciated that the position of fingers F of first B are in conflict with rotational path of prior art blade R (FIG. 4A). Indeed, fingers F of first B must be displaced from prior art handle 33P to accommodate rotational path of prior art blade R as prior art blade 31P is, in some fashion, conveyed from its position for storage to its position for use. As previously stated, the resulting period of delay and compromised control over prior art folding karambit 5P, in the context of combat-related crisis, is singularly undesirable.

Figure 1A:
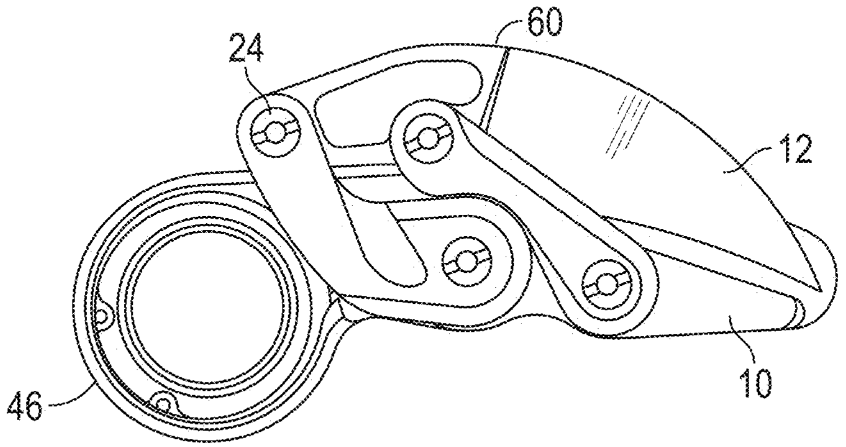
FIG. 1A shows an orthogonal view of the present invention in such condition that the blade is in its position for storage.
Figure 1B:
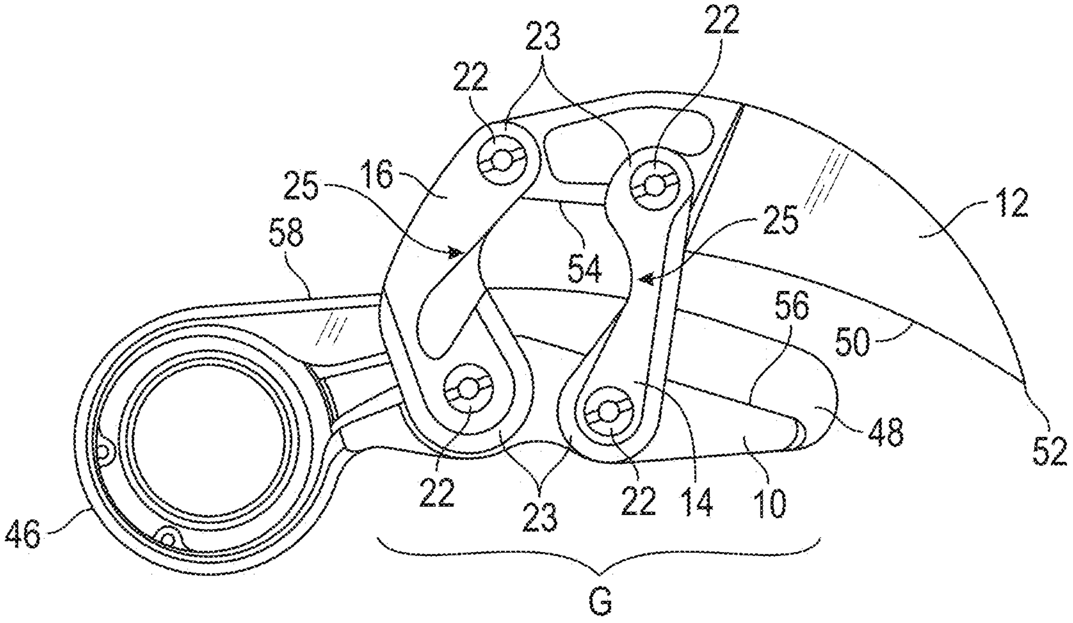
FIG. 1B shows an orthogonal view of the present invention in such condition that the blade is positioned partially between its position for storage and its position for use.
Figure 1C:
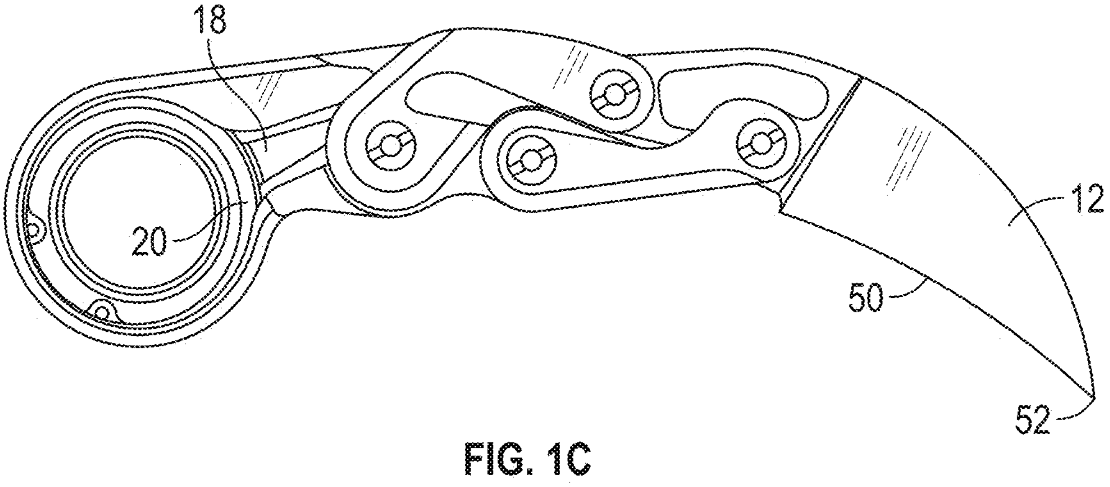
FIG. 1C shows an orthogonal view of the present invention in such condition that the blade is in its position for use.

The present invention is responsive to this deficiency, as may be appreciated more fully in light of the following:

FIGS. 1A to 1C illustrate the preferred embodiment of the present invention with blade 12 in its position for storage (FIG. 1A), an intermediate position between its position for storage and its position for use (FIG. 1B), and it position for use (FIG. 1C). Considered together with FIGS. 3A to 3C, which depict the present invention grasped in first B and with blade 12 in its position for storage (FIG. 3A), intermediate between its position for storage and position for use (FIG. 3B), and in its position for use (FIG. 3C), the novel action of the present invention and how it diverges from prior art, detailed above, may be readily understood.

FIG. 1A sets forth a view of the principle components comprising the present invention with blade 12 in its position for storage. A handle 10 is conveniently proportioned for grasping consistent with the style and traditional means of use of the implement, in this case a karambit knife. As a result, the preferred embodiment includes a prominent ring portion 46 (FIG. 1A) and a grasping portion G (FIG. 1B). Ring portion 46, constitutes a ring at one prominent end of handle 10 through which a user may insert index finger 70 (FIG. 3A). Grasping portion G (FIG. 1B) is of suitable size and contour to accommodate fingers F (FIGS. 3A, 3C) for grasping the present invention while in use. Handle 10 further includes a blade guard 48 configured to partially shield blade edge 50 and blade point 52 while blade 12 is in its position for storage, protecting against unintentional interaction (FIG. 1B).

Front conveyance arm 14 and rear conveyance arm 16 are elongated linking elements with instances of pivot hole 72 (FIG. 2A) located near the two prominent ends 23 of each, which form a concave portion 25 of the respective conveyance arm therebetween. FIG. 1B shows front conveyance arm 14 and rear conveyance arm 16 pivotably mounted to handle 10 and blade 12 by multiple instances of pivot element 22 in conjunction with multiple instances of pivot hole 72 (FIG. 2A).

Figure 2A:
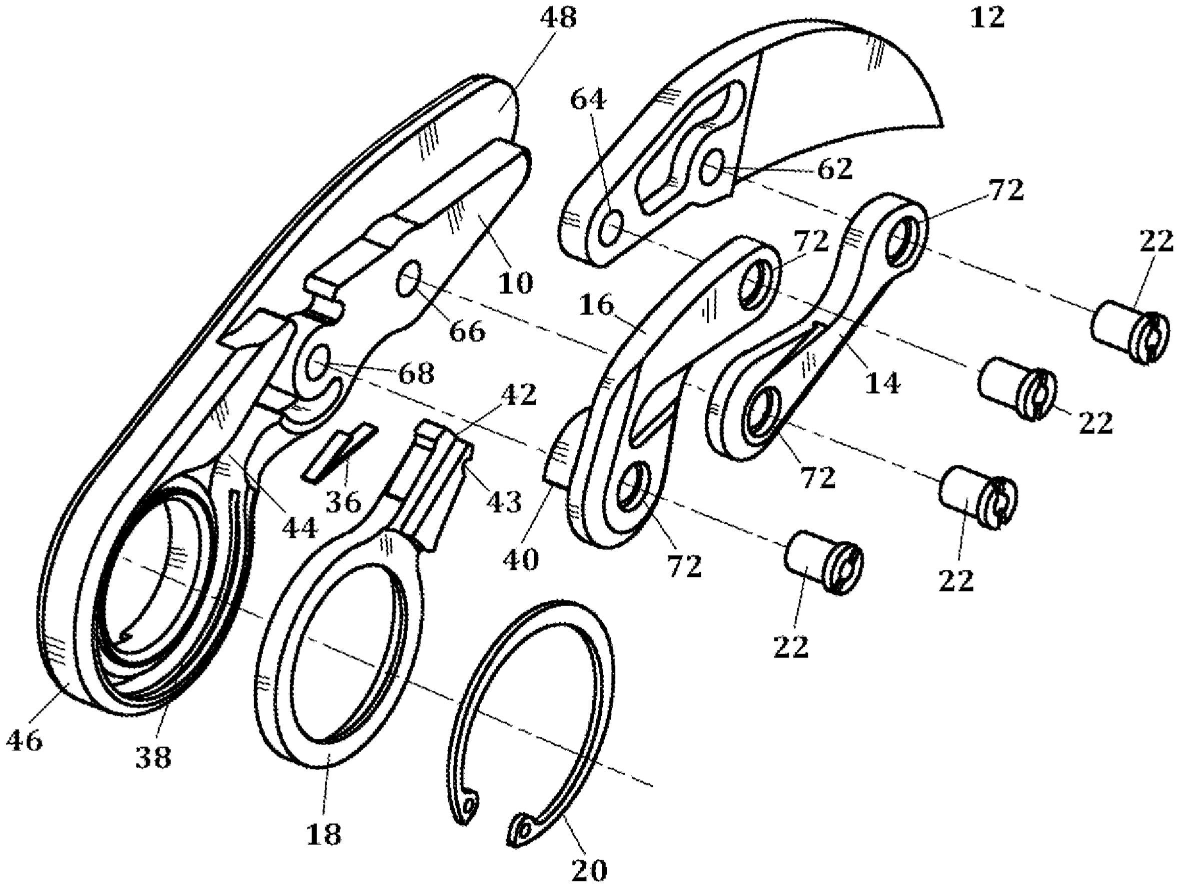
FIG. 2A shows an exploded view of the present invention.

The angle of blade edge 50 of blade 12 with respect to handle 10 is determined by the relative length of front conveyance arm 14 and rear conveyance arm 16 with regard to each other, and the positions of fore pivot hole/handle 66, aft pivot hole/handle 68, and fore pivot hole/blade 62 and aft pivot hole/blade 64 (FIG. 2A). A large degree of flexibility is therefore available for altering the angle of blade 12 relative to handle 10 in both position for storage and in position for use as may be desirable with regard to alternative embodiments.

Most importantly, FIGS. 3A to 3C show that blade 12 does not follow the rotational path of prior art blade R (FIG. 4A) wherein prior art blade point 53P travels approximately 180 degrees about a single rotational axis defined by prior art blade pivot 49P. Rather, blade 12 of the present invention is impelled along a novel conveyance path P (FIG. 3B) that does not require fingers F (FIG. 3A) to be displaced from handle 10 as blade 12 moves between its position for storage and its position for use.

Furthermore, manually impelling blade 12 along conveyance path P to its position for use is conveniently accomplished with a comparatively intuitive movement of thumb 71 acting upon an actuation surface 24 (FIGS. 3A, 1A), For the purposes of the preferred embodiment, actuation surface 24 defines a contour at one prominent end of rear conveyance arm 16. Other embodiments may easily include additional levers to operationally act upon actuation surface 24 which itself may be relocated to another portion of front conveyance arm 14, rear conveyance arm 16, or blade 12 without substantially departing from the substance of the present invention.

A closer examination of FIG. 3A shows thumb 71 contacting actuation surface 24, with fingers F of first B encircling handle 10. This grip is effectively comparable to that of prior art folding karambit 5P (FIG. 4A) and impact/pressure surface A 26, and impact/pressure surface B 28 are exposed for use (FIG. 3A). The tightening of first B increases pressure on heel portion 60 of blade 12 (FIG. 1A) compelling blade 12 toward its position for storage. As a result, impacts directed toward impact/pressure surface A 26 and impact/pressure surface B 28, do not induce unintended movement of blade 12 toward its position for use (FIG. 3A).

FIG. 3B depicts thumb 71 impelling blade 12 toward its position for use. Though distended, first B substantially maintains its integrity and there is no need to engage a second hand or alternate means to compel blade 12 toward its position for use. FIG. 3C displays blade 12 fully extended into its position for use with fingers F maintaining position with regard to first B.

While in its position for use, blade 12 is prevented from further extension by means of blade stop/open 56 on handle 10 which is configured to interact with positional index surface 54 on blade 12 (FIG. 1B). Conversely, defining the limit of blade travel toward its position for storage, positional index surface 54 of blade 12 interacts with blade stop/closed 58 on handle 10.

The following description of locking and closing-detent means concerns the preferred embodiment of this disclosure. A great variety of locks and closing-detent means may be readily adapted to the present invention. As a result, blade lock and closing-detent means disclosed herein should not be considered limiting with respect to the scope of the present invention.

A locking element 18 and its interaction with other parts in assembly may be best understood in light of FIG. 1C and FIG. 2A. Locking element 18 defines the general form of a ring with elongated boss projecting substantially radially outwardly and generally perpendicular to the ring's bore axis (FIG. 2A). Locking element 18 fits into cavity 44 in handle 10 and is substantially concentric to and pivots about a rotational axis defined by a ring-shaped portion of cavity 44 as cavity 44 extends into ring portion 46 of handle 10. Retaining ring 20 fits into retaining ring groove 38 in handle 10, securing locking element 18 into cavity 44 without obstructing rotational movement of locking element 18.

FIG. 2A further shows biasing element 36 configured to provide a directional urging for locking element 18 as may be readily appreciated by its location within the depicted assembly of the preferred embodiment. Locking element 18 includes a lockface 42 that, in conjunction with the influence of biasing element 36, is configured to interact with boss 40 of rear conveyance arm 16 so that when blade 12 is in its position for use, movement of rear conveyance arm 16 is selectively prevented. As a consequence, movement of blade 12 toward its position for storage is likewise selectively prevented, Locking element 18 further incorporates detent 43 configured to interact with boss 40 of rear conveyance arm 16 so that, in conjunction with the influence of biasing element 36, a biasing effect is provided, urging blade 12 to remain in its position for storage. In context of use, this urging may be overpowered by thumb 71 acting upon actuation surface 24 as it impels blade 12 toward its position for use (FIGS. 3A to 3C).

An additional benefit inherent to the present invention is enhanced user safety with regard to the consequences of potential lock failure. While many locking means have been devised for folding knives and subsequently adapted to folding karambits, a conspicuous hazard remains for the user of prior art folding karambit 5P (FIGS. 4A, 4B) in the event of sudden lock failure. As previously described in detail, fingers F must be removed from prior art handle 33P to allow prior art blade 31P to move along rotational path of prior art blade R. In view of FIGS. 4A,4B, the consequences of lock failure resulting in prior art blade 31P forcefully returning to its position for storage along rotational path of prior art blade R, while fingers F remain encircling prior art handle 33P are considerable.

By contrast, the benefit of the present invention in this regard might be readily appreciated in view of FIGS. 3A to 3C. In particular, FIG. 3B illustrates the approximate position blade 12 should be expected to assume in the event of catastrophic lock failure resulting in blade 12 being forcefully compelled toward its position for storage. Of note is the comparatively safe position of blade edge 50 with respect to fingers F, and the comparatively safe trajectory of blade edge 50 with respect to fingers F as blade 12 is moved in a reverse direction of conveyance path P, toward its position for storage. Indeed, as configured, blade 12 is inherently incapable of movement analogous to the potentially hazardous rotational path of prior art blade R (FIG. 4A).

While embodiments of the present invention have been illustrated and described using specific terms, such description is for present illustrative purposes only and it is to be understood that changes and variations to such embodiments, including but not limited to the substitution of equivalent features of parts and the reversal of various features thereof, may be practiced by those of ordinary skill in the art without departing from the spirit or scope of the following claims.

What is claimed is:

1. A folding knife comprising:

a handle comprising a proximal end, a distal end, a first side, and a second side, each of the first side and the second side extending from the proximal end to the distal end;

a blade member comprising a heel portion and a cutting portion, wherein the cutting portion comprises a cutting edge, wherein the blade member translates relative to the handle to move between a storage position and a use position, wherein, in the use position, at least a portion of the cutting edge extends distally relative to the distal end of the handle, and wherein, in the storage position, the cutting edge is proximal relative to the distal end of the handle;

a pair of conveyance arms comprising a rear conveyance arm and a front conveyance arm each having a first end portion and a second end portion, wherein the first end portions of the rear and front conveyance arms are pivotably coupled to the first side of the handle, and wherein the second end portions of the rear and front conveyance arms are pivotably coupled to the heel portion on a first side surface of the blade member, wherein the first end portion of the front conveyance arm is closer to the distal end of the handle than the first end portion of the rear conveyance arm, wherein the front conveyance arm comprises a first concave portion oriented toward the rear conveyance arm, and the rear conveyance arm comprises a second concave portion oriented toward the front conveyance arm; and a first pivot element pivotably coupling the first end portion of the rear conveyance arm to the handle, a second pivot element pivotably coupling the second end portion of the rear conveyance arm to the heel portion of the blade member, a third pivot element pivotably coupling the first end portion of the front conveyance arm to the handle, and a fourth pivot element coupling the second end portion of the front conveyance arm to the heel portion of the blade member, wherein, in the storage position, a first vertical plane perpendicular to an axis extending through the proximal end and the distal end of the handle and intersecting the first pivot element is positioned between a second vertical plane and a third vertical plane, wherein the second vertical plane is perpendicular to the axis extending through the proximal end and the distal end of the handle and intersects the fourth pivot element, and wherein the third vertical plane is perpendicular to the axis extending through the proximal end and the distal end of the handle and intersects the third pivot element; and wherein, in the storage position, at least a section of the first end portion of the rear conveyance arm protrudes into a first recess defined by the first concave portion of the front conveyance arm, and wherein, in the use position, at least a section of the first end portion of the front conveyance arm protrudes into a second recess defined by the second concave portion of the rear conveyance arm.

2. The folding knife of claim 1, wherein, in the use position, a fourth vertical plane perpendicular to the axis extending through the proximal end and the distal end of the handle and intersecting the second pivot element is positioned between the third vertical plane and the second vertical plane.

3. The folding knife of claim 1, wherein, relative to the handle, the blade member translates along an arcuate path to move between the storage position and the use position.

4. The folding knife of claim 1, wherein the blade member further comprises a second surface opposing the first side surface, and, wherein, in the storage position, at least a portion of the second side surface of the blade member is covered by the second side the handle, and the first side surface of the blade member is exposed from the first side of the handle.

5. The folding knife of claim 1, wherein, in the storage position, the cutting edge of the blade member is aligned with an elongate blade guard surface of the handle, the elongate blade guard surface extending perpendicularly relative to the first side and the second side of the handle.

6. The folding knife of claim 1, wherein, in the storage position, the proximal end of the handle extends proximally relative to the heel portion of the blade member.

7. The folding knife of claim 1, wherein, in the use position, the proximal end of the handle extends proximally relative to the rear conveyance arm.

8. The folding knife of claim 1, wherein the handle further comprises an open blade stop surface and a closed blade stop surface, each of the open blade stop surface and the closed blade stop surface extending perpendicularly relative to the first side to the second side of the handle, and wherein the heel portion of the blade member comprises a positional index surface.

9. The folding knife of claim 8, wherein in the storage position, the positional index surface of the heel portion contacts the closed blade stop surface of the handle, which prevents the blade member from moving farther proximally relative to the handle, and wherein in the use position, the positional index surface of the heel portion contacts the open blade stop surface of the handle, which prevents the blade member from moving farther distally relative to the handle.

10. The folding knife of claim 1, wherein, the cutting edge extends from the heel portion to a tip portion, and wherein, in the use position, the cutting edge is angled away from the axis extending through the proximal end and the distal end of the handle in a direction extending from the heel portion to the tip portion.

11. The folding knife of claim 1, wherein the blade member is angled relative to the axis extending through the proximal end and the distal end of the handle.

12. A folding knife comprising:

a handle comprising a proximal end, a distal end, a first side, and a second side, each of the first side and the second side extending from the proximal end to the distal end;

a blade member comprising a heel portion and a cutting portion, wherein the blade member translates relative to the handle to move between a storage position and a use position, wherein, in the use position, at least a portion of the cutting portion extends distally relative to the distal end of the handle, and wherein, in the storage position, the cutting portion is proximal relative to the distal end of the handle;

a pair of conveyance arms comprising a rear conveyance arm and a front conveyance arm each having a first end portion and a second end portion, wherein the first end portions of the rear and front conveyance arms are pivotably coupled to the first side of the handle, and wherein the second end portions of the rear and front conveyance arms are pivotably coupled to the heel portion on a first side surface of the blade member, wherein the first end portion of the front conveyance arm is closer to the distal end of the handle than the first end portion of the rear conveyance arm, wherein the front conveyance arm comprises a first concave portion oriented toward the rear conveyance arm, and the rear conveyance arm comprises a second concave portion oriented toward the front conveyance arm; and a first pivot element pivotably coupling the first end portion of the rear conveyance arm to the handle, a second pivot element pivotably coupling the second end portion of the rear conveyance arm to the heel portion of the blade member, a third pivot element pivotably coupling the first end portion of the front conveyance arm to the handle, and a fourth pivot element coupling the second end portion of the front conveyance arm to the heel portion of the blade member, wherein a first vertical plane perpendicular to an axis extending through the proximal end and the distal end of the handle intersects with the first pivot element, a second vertical plane perpendicular to the axis extending through the proximal end and the distal end of the handle intersects with the fourth pivot element, a third vertical plane perpendicular to the axis extending through the proximal end and the distal end of the handle intersects the third pivot element, and a fourth vertical plane perpendicular to the axis extending through the proximal end and the distal end of the handle intersects the second pivot element;

wherein, in the storage position, the first vertical plane is positioned between the second vertical plane and the third vertical plane, and wherein, in the use position, the fourth vertical plane is positioned between the third vertical plane and the second vertical plane; and wherein, in the storage position, at least a section of the first end portion of the rear conveyance arm protrudes into a first recess defined by the first concave portion of the front conveyance arm, and wherein, in the use position, at least a section of the first end portion of the front conveyance arm protrudes into a second recess defined by the second concave portion of the rear conveyance arm.

13. The folding knife of claim 12, wherein, in the storage position, the proximal end of the handle extends proximally relative to the heel portion of the blade member, and, in the use position, the proximal end of the handle extends proximally relative to the rear conveyance arm.

14. A folding knife comprising:

a handle comprising a proximal end, a distal end, a first side, and a second side, each of the first side and the second side extending from the proximal end to the distal end;

a blade member comprising a heel portion and a cutting portion, wherein the cutting portion comprises a cutting edge, wherein the blade member translates relative to the handle to move between a storage position and a use position, wherein, in the use position, at least a portion of the cutting edge extends distally relative to the distal end of the handle, and wherein, in the storage position, the cutting edge is proximal relative to the distal end of the handle;

a pair of conveyance arms comprising a rear conveyance arm and a front conveyance arm each having a first end portion and a second end portion, wherein the first end portions of the rear and front conveyance arms are pivotably coupled to the first side of the handle, and wherein the second end portions of the rear and front conveyance arms are pivotably coupled to the heel portion on a first side surface of the blade member, wherein the first end portion of the front conveyance arm is closer to the distal end of the handle than the first end portion of the rear conveyance arm, wherein the front conveyance arm comprises a concave portion oriented toward the rear conveyance arm; and a first pivot element pivotably coupling the first end portion of the rear conveyance arm to the handle, a second pivot element pivotably coupling the second end portion of the rear conveyance arm to the heel portion of the blade member, a third pivot element pivotably coupling the first end portion of the front conveyance arm to the handle, and a fourth pivot element coupling the second end portion of the front conveyance arm to the heel portion of the blade member, wherein, in the storage position, a first vertical plane perpendicular to an axis extending through the proximal end and the distal end of the handle and intersecting the first pivot element is positioned between a second vertical plane and a third vertical plane, wherein the second vertical plane is perpendicular to the axis extending through the proximal end and the distal end of the handle and intersects the fourth pivot element, and wherein the third vertical plane is perpendicular to the axis extending through the proximal end and the distal end of the handle and intersects the third pivot element;

wherein, the cutting edge extends from the heel portion to a tip portion, and wherein, in the use position, the cutting edge is angled away from the axis extending through the proximal end and the distal end of the handle in a direction extending from the heel portion to the tip portion; and wherein, in the storage position, at least a section of the first end portion of the rear conveyance arm extends into a recess defined by the concave portion of the front conveyance arm.

15. The folding knife of claim 14, wherein, in the use position, a fourth vertical plane perpendicular to the axis extending through the proximal end and the distal end of the handle and intersecting the second pivot element is positioned between the third vertical plane and the second vertical plane.

16. The folding knife of claim 14, wherein, relative to the handle, the blade member translates along an arcuate path to move between the storage position and the use position.

17. The folding knife of claim 14, wherein, in the storage position, the cutting edge of the blade member is aligned with an elongate blade guard surface of the handle, the elongate blade guard surface extending perpendicularly relative to the first side and the second side of the handle.

18. A folding knife comprising:

a handle comprising a proximal end, a distal end, a first side, and a second side, each of the first side and the second side extending from the proximal end to the distal end;

a blade member comprising a heel portion and a cutting portion, wherein the cutting portion comprises a cutting edge, wherein the blade member translates relative to the handle to move between a storage position and a use position, wherein, in the use position, at least a portion of the cutting edge extends distally relative to the distal end of the handle, and wherein, in the storage position, the cutting edge is proximal relative to the distal end of the handle;

a pair of conveyance arms comprising a rear conveyance arm and a front conveyance arm each having a first end portion and a second end portion, wherein the first end portions of the rear and front conveyance arms are pivotably coupled to the first side of the handle, and wherein the second end portions of the rear and front conveyance arms are pivotably coupled to the heel portion on a first side surface of the blade member, wherein the first end portion of the front conveyance arm is closer to the distal end of the handle than the first end portion of the rear conveyance arm, wherein the front conveyance arm comprises a concave portion oriented toward the rear conveyance arm; and a first pivot element pivotably coupling the first end portion of the rear conveyance arm to the handle, a second pivot element pivotably coupling the second end portion of the rear conveyance arm to the heel portion of the blade member, a third pivot element pivotably coupling the first end portion of the front conveyance arm to the handle, and a fourth pivot element coupling the second end portion of the front conveyance arm to the heel portion of the blade member, wherein, in the storage position, a first vertical plane perpendicular to an axis extending through the proximal end and the distal end of the handle and intersecting the first pivot element is positioned between a second vertical plane and a third vertical plane, wherein the second vertical plane is perpendicular to the axis extending through the proximal end and the distal end of the handle and intersects the fourth pivot element, and wherein the third vertical plane is perpendicular to the axis extending through the proximal end and the distal end of the handle and intersects the third pivot element; and wherein, in the storage position, at least a section of the first end portion of the rear conveyance arm extends into a recess defined by the concave portion of the front conveyance arm.

19. The folding knife of claim 18, wherein, in the use position, a fourth vertical plane perpendicular to the axis extending through the proximal end and the distal end of the handle and intersecting the second pivot element is positioned between the third vertical plane and the second vertical plane.

20. The folding knife of claim 18, wherein, relative to the handle, the blade member translates along an arcuate path to move between the storage position and the use position.

* * * * *